(12) United States Patent
Noda et al.

(10) Patent No.: US 8,465,882 B2
(45) Date of Patent: Jun. 18, 2013

(54) MEMBRANE-ELECTRODE ASSEMBLY FOR SOLID POLYMER ELECTROLYTE FUEL CELL AND SOLID POLYMER ELECTROLYTE FUEL CELL

(75) Inventors: Akihiro Noda, Wako (JP); Ryoji Takenawa, Wako (JP); Akimasa Daimaru, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 443 days.

(21) Appl. No.: 12/789,395

(22) Filed: May 27, 2010

(65) Prior Publication Data

US 2011/0027686 A1 Feb. 3, 2011

(30) Foreign Application Priority Data

Jul. 31, 2009 (JP) ................................. 2009-179719

(51) Int. Cl.
*H01M 8/10* (2006.01)
(52) U.S. Cl.
USPC ........................................... 429/483; 429/482
(58) Field of Classification Search
None
See application file for complete search history.

(56) References Cited

U.S. PATENT DOCUMENTS

2006/0046121 A1* 3/2006 Shimohira et al. .............. 429/30

FOREIGN PATENT DOCUMENTS

| JP | 05-021077 | 1/1993 |
| JP | 2008-117775 | 5/2008 |
| JP | 2008-159320 | 7/2008 |
| WO | WO2006/025335 | 3/2006 |

OTHER PUBLICATIONS

Japanese Office Action for corresponding JP Application No. 2009-179719, Jun. 5, 2012.

* cited by examiner

*Primary Examiner* — Patrick Ryan
*Assistant Examiner* — Yoshitoshi Takeuchi
(74) *Attorney, Agent, or Firm* — Ditthavong Mori & Steiner, P.C.

(57) ABSTRACT

A membrane-electrode assembly for a solid polymer electrolyte fuel cell includes a proton-conductive composite membrane including a reinforcing sheet and an electrolyte membrane. The reinforcing sheet has through-holes extending in a thickness direction of the reinforcing sheet. The through-holes are provided in a portion other than an edge of the reinforcing sheet in an in-plane direction. An anode electrode layer is provided on one surface of the proton-conductive composite membrane. A cathode electrode layer is provided on another surface of the proton-conductive composite membrane. At least one of an edge of the anode electrode layer and an edge of the cathode electrode layer in the in-plane direction is arranged outside in the in-plane direction with respect to the portion in which the plurality of through-holes are provided.

6 Claims, 8 Drawing Sheets

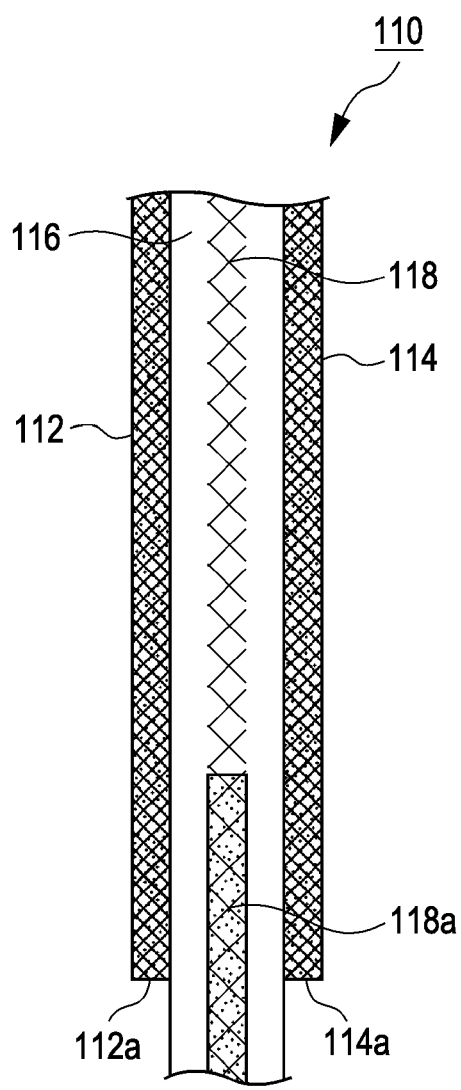

MEMBRANE-ELECTRODE ASSEMBLY FOR SOLID POLYMER ELECTROLYTE FUEL CELL AND SOLID POLYMER ELECTROLYTE FUEL CELL

CROSS REFERENCES TO RELATED APPLICATIONS

The present application claims priority under 35 U.S.C. §119 to Japanese Patent Application No. 2009-179719, filed Jul. 31, 2009, entitled "Membrane-electrode assembly for solid polymer electrolyte fuel cell and solid polymer electrolyte fuel cell". The contents of this application are incorporated herein by reference in their entirety.

BACKGROUND OF THE INVENTION

1. Field of the Invention

The present invention relates to a membrane-electrode assembly for a solid polymer electrolyte fuel cell and a solid polymer electrolyte fuel cell.

2. Description of the Related Art

A typical membrane-electrode assembly for a solid polymer electrolyte fuel cell includes a solid polymer electrolyte membrane having proton conductivity, a cathode electrode layer provided on one surface of the membrane, an anode electrode layer provided on another surface of the membrane, and gas diffusion layers stacked on these electrode layers. A solid polymer electrolyte fuel cell is formed by stacking separators, which also function as gas flow paths, on the gas diffusion layers of the membrane-electrode assembly having the above structure.

To improve the performance of solid polymer electrolyte fuel cells, it is necessary to reduce the thickness of a polymer electrolyte membrane as much as possible so as to improve proton conductivity. On the other hand, a problem of a decrease in the strength of the polymer electrolyte membrane occurs. In addition, sufficient strength and durability are desired for such a solid polymer electrolyte membrane so that breaking or the like does not occur even during long-term use, and thus various studies have been conducted.

FIG. 10 is a cross-sectional view showing the structure of a membrane-electrode assembly 100 for a solid polymer electrolyte fuel cell in the related art (refer to Japanese Unexamined Patent Application Publication No. 5-21077). In the membrane-electrode assembly 100, a frame-shaped protective film 102 composed of a fluorocarbon resin sheet is provided on at least one surface side of a solid polymer electrolyte membrane 101, and the solid polymer electrolyte membrane 101 and the frame-shaped protective film 102 are sandwiched between an anode electrode layer 103 and a cathode electrode layer 104. According to this membrane-electrode assembly 100, the solid polymer electrolyte membrane 101 and the frame-shaped protective film 102 overlap each other, and thereby the protective film 102 functions as a reinforcing member of the solid polymer electrolyte membrane 101. Consequently, the membrane-electrode assembly 100 can withstand an increase in the differential pressure and mechanical stress applied to this portion.

FIG. 11 is a cross-sectional view showing the structure of a membrane-electrode assembly 110 for a solid polymer electrolyte fuel cell in the related art (refer to Japanese Unexamined Patent Application Publication No. 2008-117775). In the membrane-electrode assembly 110, an absorption portion 118a is provided between an anode electrode layer 112 and a cathode electrode layer 114, the absorption portion 118a extending from edge portions 112a and 114a up to a certain distance. According to this membrane-electrode assembly 110, it is possible to suppress degradation of a polymer in a polymer electrolyte membrane layer 116 provided with a reinforcing layer 118, the degradation being due to hydroxy radicals generated by an electrochemical reaction.

However, in the membrane-electrode assembly 100 disclosed in Japanese Unexamined Patent Application Publication No. 5-21077, a dimensional change in the solid polymer electrolyte membrane 101 due to a change in the humidity may cause detachment at an interface between the solid polymer electrolyte membrane 101 and the protective film 102. In addition, the solid polymer electrolyte membrane 101 may become degraded in some cases and has a problem in terms of durability.

Also, in the membrane-electrode assembly 110 disclosed in Japanese Unexamined Patent Application Publication No. 2008-117775, although it is possible to suppress chemical degradation of the polymer electrolyte membrane layer 116 due to hydroxy radicals generated by an electrochemical reaction, a degradation due to a dimensional change in the polymer electrolyte membrane layer 116 caused by a change in the humidity may occur in a portion of the polymer electrolyte membrane layer 116, the portion being in contact with a sealing layer or adhesive layer used for stacking.

SUMMARY OF THE INVENTION

According to one aspect of the present invention, a membrane-electrode assembly for a solid polymer electrolyte fuel cell includes a proton-conductive composite membrane, an anode electrode layer, and a cathode electrode layer. The proton-conductive composite membrane includes a reinforcing sheet and an electrolyte membrane. The reinforcing sheet has a plurality of through-holes extending in a thickness direction of the reinforcing sheet. The through-holes are provided in a portion other than an edge of the reinforcing sheet in an in-plane direction. The electrolyte membrane is provided on a surface of the portion of the reinforcing sheet in which the plurality of through-holes are provided and on an inner surface of the through-holes. The anode electrode layer is provided on one surface of the proton-conductive composite membrane. The cathode electrode layer is provided on another surface of the proton-conductive composite membrane. At least one of an edge of the anode electrode layer and an edge of the cathode electrode layer in the in-plane direction is arranged outside in the in-plane direction with respect to the portion in which the plurality of through-holes are provided.

According to another aspect of the present invention, a solid polymer electrolyte fuel cell includes the membrane-electrode assembly according to the first aspect of the present invention, a pair of separators, and at least one of an adhesive layer and a sealing layer. The pair of separators are stacked on both surfaces of the membrane-electrode assembly to form gas flow paths. The adhesive layer is for bonding constituent members together. The sealing layer is provided on the constituent members to seal the gas flow paths. At least one of the adhesive layer and the sealing layer is arranged on a portion of the proton-conductive composite membrane where the electrolyte membrane is not provided.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 11 is a cross-sectional view showing the structure of a membrane-electrode assembly in the related art.

DESCRIPTION OF THE EMBODIMENT

An embodiment of the present invention will now be described in detail with reference to the accompanying drawings.

Figure 1:
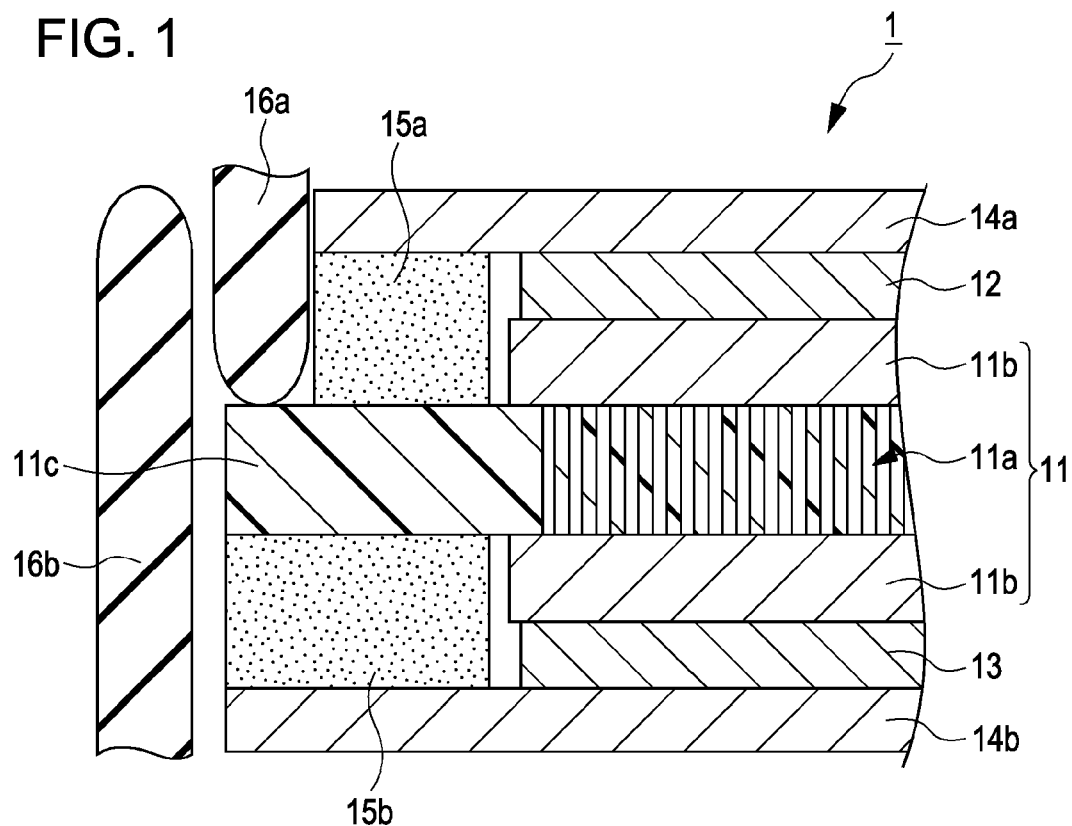
FIG. 1 is a cross-sectional view showing the structure of a membrane-electrode assembly according to an embodiment of the present invention.

FIG. 1 is a cross-sectional view showing the structure of a membrane-electrode assembly 1 of a solid polymer electrolyte fuel cell according to an embodiment of the present invention. As shown in FIG. 1, the membrane-electrode assembly 1 of this embodiment includes a proton-conductive composite membrane 11, an anode electrode layer 12 provided on one surface of the proton-conductive composite membrane 11, and a cathode electrode layer 13 provided on another surface of the proton-conductive composite membrane 11. A pair of gas diffusion layers 14*a* and 14*b* are further provided on the anode electrode layer 12 and the cathode electrode layer 13.

The proton-conductive composite membrane 11 includes a reinforcing sheet and an electrolyte membrane 11*b*. The reinforcing sheet includes a plurality of through-holes extending in the thickness direction, the through-holes being provided in a portion other than an edge 11*c* of the reinforcing sheet in an in-plane direction. Specifically, the reinforcing sheet is obtained by forming fine through-holes in a commercially available resin film. The resin film is not particularly limited, but engineering plastic materials are preferably used as the resin film. Among engineering plastic materials, polyimide (PI) resins, which have good heat resistance, are more preferably used.

Specific examples of the process of forming the fine through-holes include laser processing, etching processing, and press processing. In laser processing, commercially available UV solid-state lasers, excimer lasers, $CO_2$ lasers, or the like can be used. Furthermore, a more precise process of forming the fine through-holes can be conducted by a mask imaging system using these lasers. Also in etching processing or press processing, such fine through-holes can be formed using a commercially available apparatus. In press processing, a rapid process can be performed in one pressing step using a die for multiple holes. Through-holes having a desired hole diameter (μm), distance between the centers of holes (pitch μm), and hole area percentage (%) can be formed by the above process.

Figure 2:
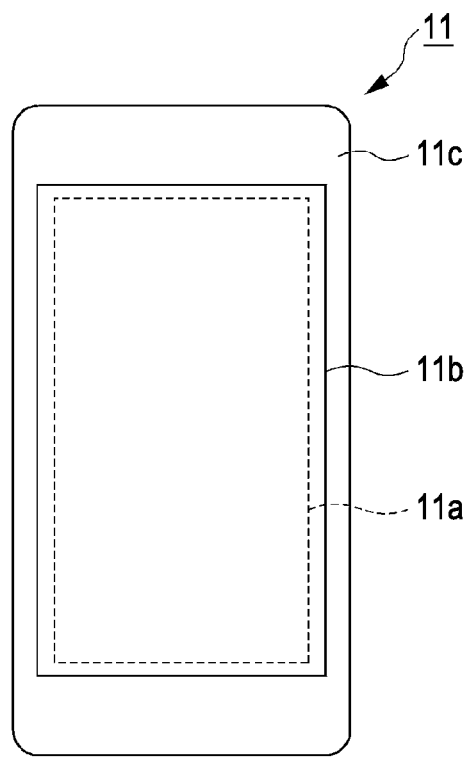
FIG. 2 is a plan view of a proton-conductive composite membrane according to an embodiment of the present invention.

FIG. 2 is a plan view of the proton-conductive composite membrane 11 according to this embodiment. As shown in FIG. 2, in the proton-conductive composite membrane 11, a portion other than an edge of the reinforcing sheet (i.e., a portion surrounded by a peripheral portion of the reinforcing sheet), which corresponds to the edge 11*c* of the proton-conductive composite membrane 11 in an in-plane direction, corresponds to a portion 11*a* in which a plurality of through-holes are provided. The electrolyte membrane 11*b* is provided on the surfaces of the portion 11*a* in which the through-holes are provided and on the inner surfaces of the through-holes of the reinforcing sheet. In this embodiment, the electrolyte membrane 11*b* is formed on the reinforcing sheet so as to extend to an area slightly outside the portion 11*a* in which the through-holes are provided. This embodiment is also included in the scope of the present invention.

Figure 3:
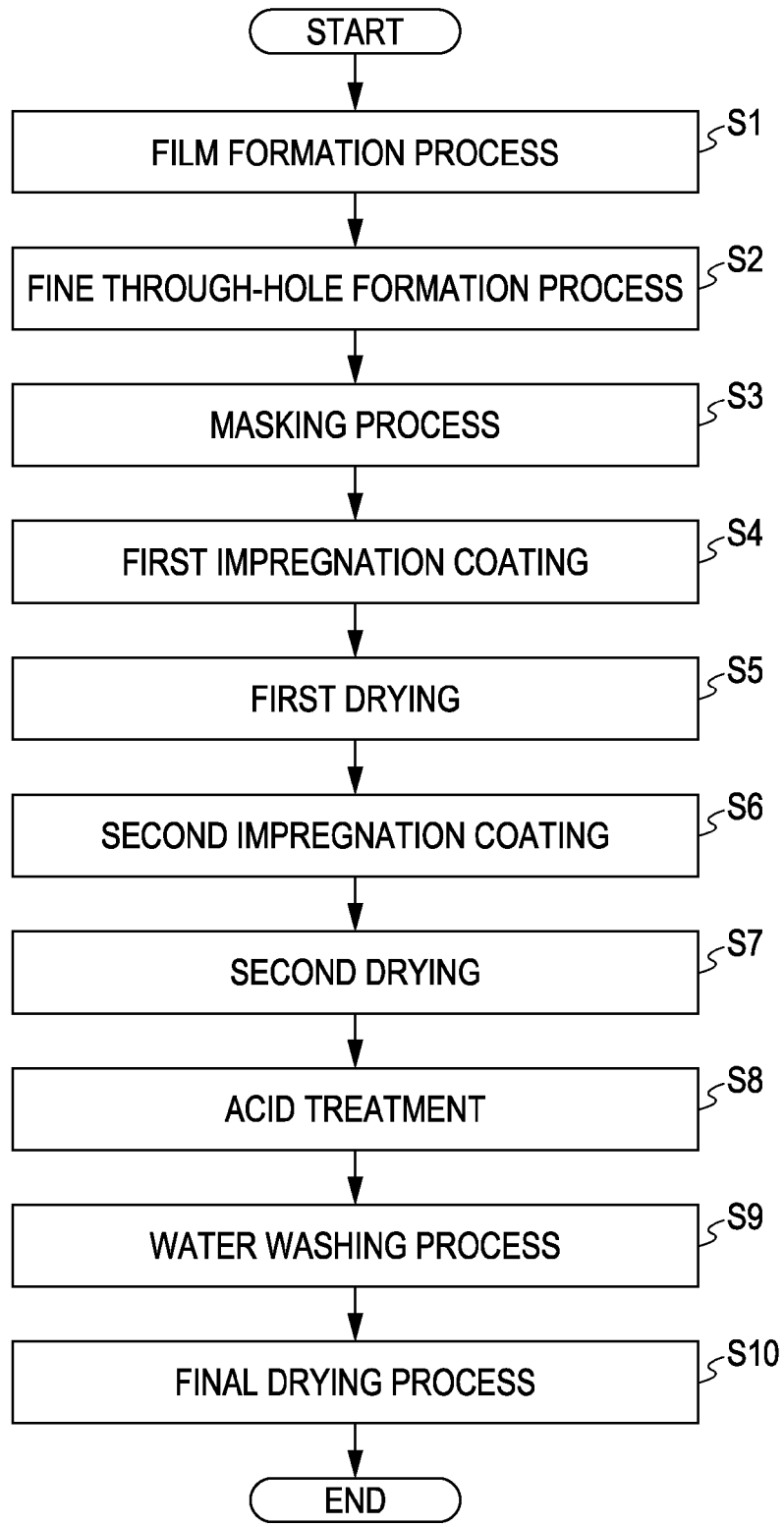
FIG. 3 is a flowchart showing a procedure of making a proton-conductive composite membrane according to an embodiment of the present invention.

Next, a method of making the proton-conductive composite membrane 11 according to this embodiment will be described in detail. FIG. 3 is a flowchart showing a procedure of making the proton-conductive composite membrane 11 according to this embodiment. First, in step S1, a film formation process of a resin film constituting a reinforcing sheet is conducted. Specifically, a film is formed using an engineering plastic resin such as polyimide so as to have a desired thickness.

In step S2, a fine through-hole formation process is conducted on the resin film obtained in step S1. Specifically, as described above, through-holes extending in the thickness direction are formed by laser processing, etching processing, press processing, or the like. Thus, the reinforcing sheet having the through-holes therein is obtained.

In step S3, a masking process is conducted on the reinforcing sheet having the through-holes therein. Specifically, a masking film (e.g., a polyethylene terephthalate (PET) film) having an opening at a position of the reinforcing sheet, the position corresponding to a portion in which the through-holes are provided, is stacked on each surface of the reinforcing sheet. Thus, the coating area in a coating process in step S4 described below is controlled. Note that the size of the opening of the masking film may be slightly larger than the size of the portion in which the through-holes are provided.

In step S4, the reinforcing sheet that has been subjected to the masking process is coated with an electrolyte casting solution by impregnation, thus conducting a first impregnation coating. An existing electrolyte casting solution is used as the electrolyte casting solution. Examples thereof include Nafion (registered trademark) DE2020 and Nafion (registered trademark) DE2020CS both of which are produced by DuPont.

In step S5, a first drying process is conducted on the reinforcing sheet that has been subjected to the impregnation coating. Specifically, the first drying process is conducted at 60° C. for five minutes.

In step S6, a second impregnation coating is conducted. In the second impregnation coating, the same process as the first impregnation coating conducted in step S4 is conducted.

In step S7, a second drying process is conducted on the reinforcing sheet that has been subjected to the second impregnation coating. Specifically, the reinforcing sheet is sequentially dried at 60° C. for 60 minutes, at 100° C. for 15 minutes, and then left to cool for 30 minutes.

In step S8, an acid treatment is conducted on the reinforcing sheet that has been subjected to the first and second impregnation coatings and drying processes. Specifically, the reinforcing sheet is immersed in a 0.5 M aqueous sulfuric acid solution at room temperature for 10 minutes. After the immersion, the reinforcing sheet is pulled up from the aqueous sulfuric acid solution, and the aqueous sulfuric acid solution adhered to the reinforcing sheet is sufficiently removed.

In step S9, a water washing process is conducted on the reinforcing sheet that has been subjected to the acid treatment. Specifically, the reinforcing sheet is immersed in purified water at room temperature for 10 minutes. After the immersion, the reinforcing sheet is pulled up from the purified water, and the purified water adhered to the reinforcing sheet is sufficiently removed.

In step S10, a final drying process is conducted on the reinforcing sheet that has been subjected to the water washing process. Specifically, the final drying process is conducted at 60° C. for 60 minutes and at 100° C. for 15 minutes in this order. Thus, the proton-conductive composite membrane 11 according to this embodiment is obtained.

Referring to FIG. 1 again, as the anode electrode layer 12 and the cathode electrode layer 13, hitherto known electrodes are used. These electrode layers are formed by an existing method such as a transfer method by hot-pressing. Furthermore, an edge of the anode electrode layer 12 in the in-plane direction and an edge of the cathode electrode layer 13 in the in-plane direction are arranged outside in the in-plane direction with respect to the portion 11a in which the plurality of through-holes are provided.

As the gas diffusion layers 14a and 14b, hitherto known gas diffusion layers are used. In this embodiment, a carbon paper sheet is used as each of the gas diffusion layers 14a and 14b. These gas diffusion layers 14a and 14b are formed by a known method such as integration by hot-pressing. Furthermore, these gas diffusion layers 14a and 14b are bonded to the edge 11c of the proton-conductive composite membrane 11 in the in-plane direction, with adhesive layers 15a and 15b, respectively. Specifically, in this embodiment, each of the adhesive layers 15a and 15b is disposed only on a portion where the electrolyte membrane 11b is not provided. An existing adhesive is used as an adhesive that forms the adhesive layers 15a and 15b.

Furthermore, a pair of separators (not shown) are provided on the pair of gas diffusion layers 14a and 14b. Consequently, the membrane-electrode assembly 1 of this embodiment constitutes a solid polymer electrolyte fuel cell. The pair of separators are stacked on the gas diffusion layers 14a and 14b to form gas flow paths.

In this embodiment, sealing layers 16a and 16b for sealing the gas flow paths are provided. However, the sealing layers 16a and 16b are arranged only on the edge 11c of the proton-conductive composite membrane 11 in the in-plane direction, the edge 11c not having the electrolyte membrane 11b thereon. The sealing layers 16a and 16b are formed by a known liquid silicone rubber injection molding system (LIMS).

Figure 4:
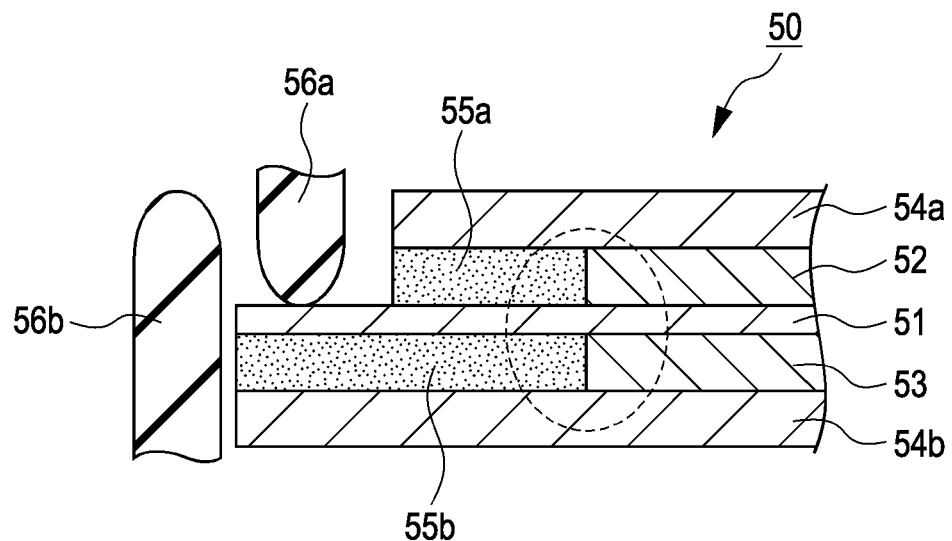
FIG. 4 is a cross-sectional view showing the structure of a membrane-electrode assembly in the related art.

Here, problems of an existing membrane-electrode assembly for a solid polymer electrolyte fuel cell will be described. FIG. 4 is a cross-sectional view showing the structure of an existing typical membrane-electrode assembly 50 for a solid polymer electrolyte fuel cell. As shown in FIG. 4, the existing membrane-electrode assembly 50 for a solid polymer electrolyte fuel cell includes a proton-conductive membrane 51, an anode electrode layer 52 stacked on one surface of the proton-conductive membrane 51, a cathode electrode layer 53 stacked on another surface of the proton-conductive membrane 51, and carbon paper sheets 54a and 54b that function as a pair of gas diffusion layers and that are stacked on the two electrode layers 52 and 53. Edges of the pair of carbon paper sheets 54a and 54b in the in-plane direction are bonded to the proton-conductive membrane 51 with adhesive layers 55a and 55b, respectively.

The adhesive layers 55a and 55b are provided in contact with the anode electrode layer 52 and the cathode electrode layer 53, respectively. In addition, the edges of the carbon paper sheet 54b and the adhesive layer 55b in the in-plane direction are arranged outside in the in-plane direction with respect to the edges of the carbon paper sheet 54a and the adhesive layer 55a in the in-plane direction. That is, a so-called step structure is used as an edge structure of the membrane-electrode assembly 50 in the in-plane direction.

Sealing layers 56a and 56b are formed by a liquid silicone rubber injection molding system (LIMS). These sealing layers 56a and 56b seal gas flow paths to prevent a gas leakage. Each of the sealing layers 56a and 56b is in contact with the proton-conductive membrane 51.

The following problems occur in the existing membrane-electrode assembly 50 having the above structure. First, chemical degradation occurs in the proton-conductive membrane 51 (i.e., the portion other than the dotted line of FIG. 4) located near edges of the anode electrode layer 52 and the cathode electrode layer 53 in the in-plane direction. The reason for this is believed to be as follows. When the position of an edge of the anode electrode layer 52 in the in-plane direction does not coincide with the position of an edge of the cathode electrode layer 53 in the in-plane direction, the balance between the amount of supply and the amount of consumption of protons is disrupted. As a result, abnormality of the proton concentration occurs in the proton-conductive membrane 51 located near the two edges.

Specifically, when the edge of the anode electrode layer 52 in the in-plane direction is located outside the edge of the cathode electrode layer 53 in the in-plane direction, protons supplied from the anode electrode layer 52 cannot sufficiently consumed in the cathode electrode layer 53. As a result, the proton concentration becomes excessive in the proton-conductive membrane 51 located near the two edges. On the other hand, when the edge of the cathode electrode layer 53 in the in-plane direction is located outside the edge of the anode electrode layer 52 in the in-plane direction, the anode electrode layer 52 cannot supply a sufficient amount of protons consumed in the cathode electrode layer 53. As a result, the proton concentration becomes insufficient in the proton-conductive membrane 51 located near the two edges. It is believed that, in this manner, chemical degradation due to abnormality of the proton concentration occurs in the proton-conductive membrane 51 located near the edges of the anode electrode layer 52 and the cathode electrode layer 53 in the in-plane direction.

Figure 5:
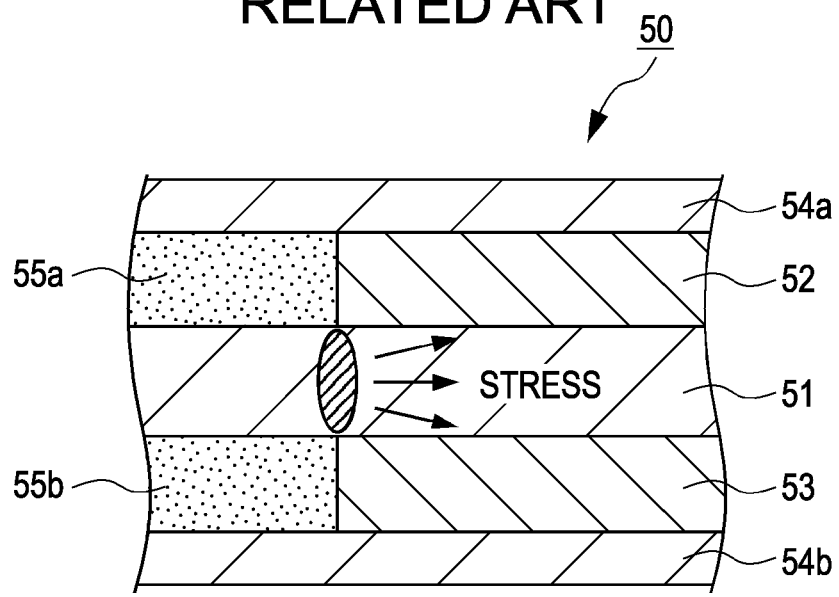
FIG. 5 is an enlarged view of the relevant part of FIG. 4.
Figure 6:
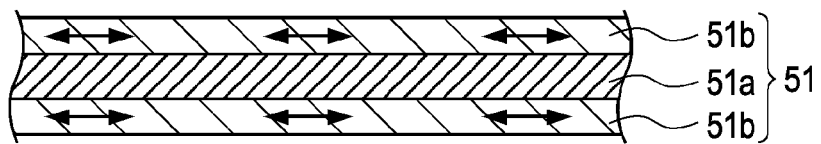
FIG. 6 is a cross-sectional view showing the structure of a proton-conductive membrane of a membrane-electrode assembly in the related art.

Secondly, since the adhesive layers 55a and 55b are bonded to an edge of the proton-conductive membrane 51 in the in-plane direction, breaking occurs in a boundary portion between a portion of the proton-conductive membrane 51, the portion being bonded to the adhesive layers 55a and 55b, and a portion of the proton-conductive membrane 51, the portion being not bonded to the adhesive layer 55a or 55b. A detailed description will be made with reference to FIGS. 5 and 6. FIG. 5 is an enlarged view of boundary portions between the adhesive layer 55a and the anode electrode layer 52 and between the adhesive layer 55b and the cathode electrode layer 53. When the humidity changes, the dimension of the proton-conductive membrane 51 in the in-plane direction significantly changes. Consequently, as shown in FIG. 5, a stress is concentrated (as shown by the arrows in FIG. 5) at a boundary between a portion of the proton-conductive membrane 51, the portion being bonded to the adhesive layers 55a and 55b, and a portion of the proton-conductive membrane 51, the portion being not bonded to the adhesive layer 55a or 55b. As shown in FIG. 6, the proton-conductive membrane 51 includes a sheet-like reinforcing material 51a and electrolyte membranes 51b provided on both surfaces of the reinforcing material 51a. Therefore, the proton-conductive membrane 51 has a structure in which a stress (shown by the double-sided arrows in FIG. 6) that is generated by a dimensional change in the electrolyte membranes 51b due to a change in the humidity is easily dispersed. However, in reality, the stress cannot be sufficiently dispersed, and the concentration of the stress described above cannot be sufficiently prevented. Consequently, breaking of the proton-conductive membrane 51 occurs.

Thirdly, chemical degradation occurs in a portion in which the adhesive layers 55a and 55b or the sealing layers 56a and 56b are in contact with the proton-conductive membrane 51. The reason for this is believed to be as follows. The proton-conductive membrane 51 usually contains an acid component, and this acid component contacts the adhesive layers 55a and 55b or the sealing layers 56a and 56b, resulting in the occurrence of the chemical degradation.

In contrast, according to the membrane-electrode assembly 1 of this embodiment, which has the structure described above, and a solid polymer electrolyte fuel cell including the membrane-electrode assembly 1, the following significant advantages that can solve the above-described problems in the related art are achieved.

According to this embodiment, a proton-conductive composite membrane of a membrane-electrode assembly for a solid polymer electrolyte fuel cell includes a reinforcing sheet having a plurality of through-holes extending in the thickness direction, the through-holes being provided in a portion other than the edges of the reinforcing sheet in the in-plane direction, and an electrolyte membrane provided at least on the surfaces of the portion having the through-holes and on the inner surfaces of the through-holes. With this structure, a dimensional change in the electrolyte membrane caused by expansion and contraction in the in-plane direction due to a change in the humidity can be suppressed by the reinforcing sheet, while maintaining good proton conductivity. That is, according to the embodiment of the present invention, a membrane-electrode assembly for a solid polymer electrolyte fuel cell, the membrane-electrode assembly having good durability and a high mechanical strength regardless of a change in the humidity, can be obtained.

In addition, according to this embodiment, the membrane-electrode assembly for a solid polymer electrolyte fuel cell is configured so that the edge of the anode electrode layer in the in-plane direction and/or the edge of the cathode electrode layer in the in-plane direction are arranged outside in the in-plane direction with respect to the portion in which the plurality of through-holes are provided. With this structure, since the electrolyte membrane is not provided near the edge of the electrode layers in the in-plane direction, chemical degradation of the electrolyte membrane due to abnormality of the proton concentration, the degradation occurring in the related art near the edges of the electrode layers in the in-plane direction, can be suppressed to obtain good durability.

Furthermore, according to this embodiment, in a solid polymer electrolyte fuel cell including the above-described membrane-electrode assembly for a solid polymer electrolyte fuel cell, the solid polymer electrolyte fuel cell is configured so that at least one of an adhesive layer for bonding constituent members together and a sealing layer that is provided on the constituent members to seal the gas flow paths is arranged only on a portion of the proton-conductive composite membrane, the portion not having the electrolyte membrane thereon. With this structure, a stress generated when a boundary portion between a portion that is in contact with the adhesive layer or the sealing layer and a portion that is not in contact with the adhesive layer or the sealing layer is constrained by a dimensional change in the electrolyte membrane in the in-plane direction due to a change in the humidity can be released by being received at the edge of the reinforcing sheet, the edge not having the electrolyte membrane thereon. Thus, according to the embodiment of the present invention, a solid polymer electrolyte fuel cell having a high mechanical strength and high durability regardless of a change in the humidity can be obtained. Furthermore, it is possible to prevent an acid component contained in the electrolyte membrane from contacting the adhesive layer and the sealing layer. Accordingly, degradation of the adhesive layer and the sealing layer can be prevented, and cross-leakage and gas leakage to the outside can also be suppressed.

The present invention is not limited to the above embodiment, and modifications, improvements, and the like that do not depart from the gist of the present invention are also included in the present invention.

EXAMPLES

Example of the present invention will now be described, but the present invention is not limited thereto.

Example 1

A proton-conductive composite membrane was prepared in accordance with the flowchart shown in FIG. 3. A polyimide film with a thickness of 12.5 μm that was subjected to a fine through-hole formation process was used as a reinforcing sheet. The fine through-hole formation process was conducted by a mask imaging system using an excimer laser produced by T & K Inc. The diameter of fine through-holes was 70 μm and the distance between the centers of the holes (pitch) was 105 μm. In impregnation coatings, in the in-plane direction, a masking film (PET film) having an opening size 1 mm larger than a portion in which the through-holes were formed was used. A 20% by mass solution of Nafion (registered trademark) DE2020 produced by DuPont was used as an electrolyte solution. The thickness of the resulting electrolyte membrane was 20 μm.

Comparative Example 1

A proton-conductive membrane was prepared using, as an electrolyte solution, a 20% by mass solution of Nafion (registered trademark) DE2020 produced by DuPont without using a reinforcing sheet. The thickness of the resulting electrolyte membrane was 25 μm.

Evaluation of Durability

A wetting/drying cycle durability acceleration test was conducted for the proton-conductive composite membrane of Example 1 and the proton-conductive membrane of Comparative Example 1. Specifically, a sample was set in a cell, the temperature was then set to 80° C., and the relative humidity was repeatedly changed in the range of 0% to 100% in $H_2$/air.

Figure 7:
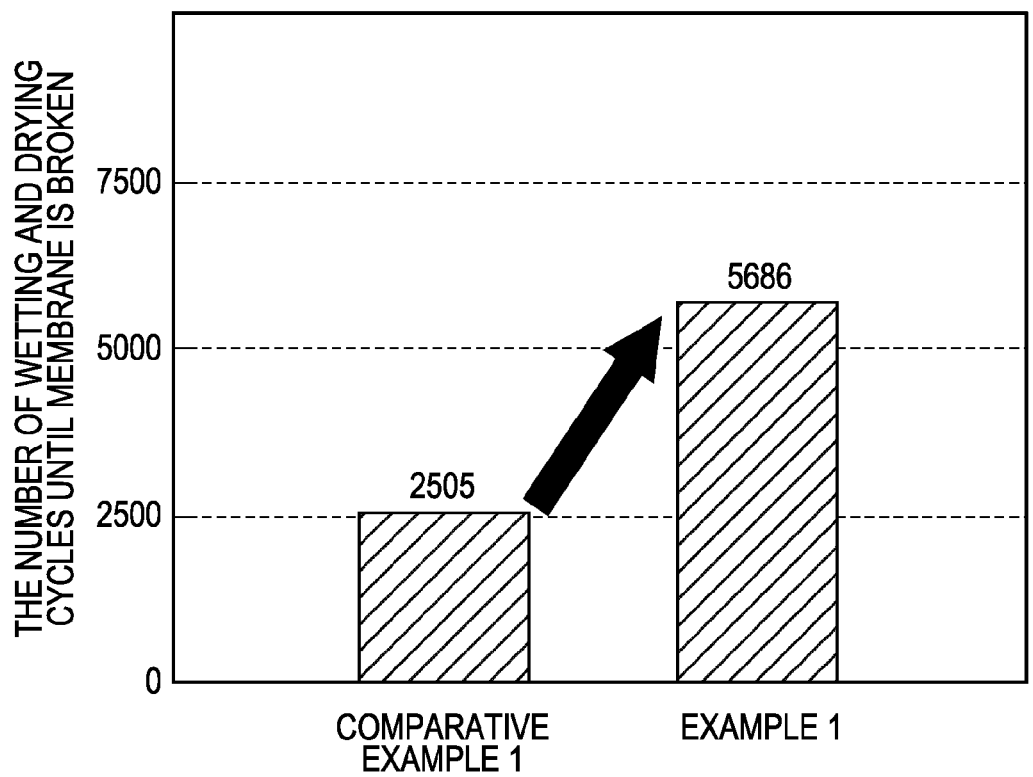
FIG. 7 is a graph showing the number of wetting and drying cycles until membranes of Example 1 and Comparative Example 1 are broken.

The results of the wetting/drying cycle durability acceleration test are shown in FIG. 7. FIG. 7 is a graph showing the number of wetting and drying cycles until the proton-conductive composite membrane of Example 1 and the proton-conductive membrane of Comparative Example 1 were broken.

As shown in FIG. 7, the number of wetting and drying cycles until the proton-conductive composite membrane of Example 1 was broken was markedly increased as compared with Comparative Example 1. This result shows that when a membrane-electrode assembly for a solid polymer electrolyte fuel cell or a solid polymer electrolyte fuel cell is produced using the proton-conductive composite membrane of Example 1, high durability is achieved as compared with a case where an existing proton-conductive membrane is used.

Evaluation of Dimensional Change Due to Change in Humidity

A dimensional change in the in-plane direction due to a change in the humidity was measured for the proton-conductive composite membrane of Example 1 and the proton-conductive membrane of Comparative Example 1. Specifically, the measurement was conducted in a constant temperature and humidity chamber BL-3 KP produced by ESPEC Corp. in a state in which the temperature and humidity were controlled. The temperature was set to 25° C., and the relative humidity was repeatedly changed by a procedure including (a) to (g) below.

(a) An initial relative humidity of 50% was maintained for 30 minutes.
(b) The relative humidity was decreased to 35% over a period of 30 minutes.
(c) The relative humidity of 35% was maintained for 30 minutes.
(d) The relative humidity was increased to 90% over a period of 30 minutes.
(e) The relative humidity of 90% was maintained for 30 minutes.
(f) The relative humidity was decreased to 35% over a period of 30 minutes.
(g) The relative humidity of 35% was maintained for 30 minutes.

Figure 8:
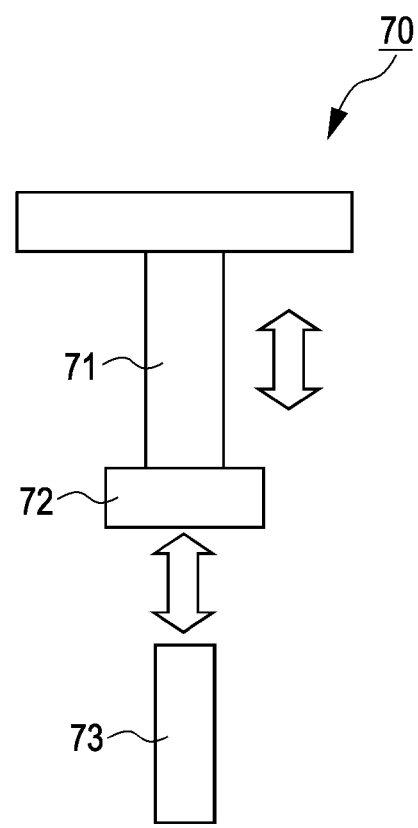
FIG. 8 is a view illustrating a method for measuring a dimensional change due to a change in the humidity.

The dimensional change was measured with a measuring device 70 provided in the constant temperature and humidity chamber and having the structure shown in FIG. 8. Specifically, one end of a sample 71 of each of the proton-conductive composite membrane and the proton-conductive membrane, the sample being prepared by cutting into a strip (10 mm×50 mm), was fixed, and a jig functioning as a target 72 of a gap sensor 73 was fixed to another end of the sample 71. The distance between the target 72 and the gap sensor 73 was measured in this state, and the distance was converted to a dimension of each of the samples of the proton-conductive composite membrane and the proton-conductive membrane.

Figure 9:
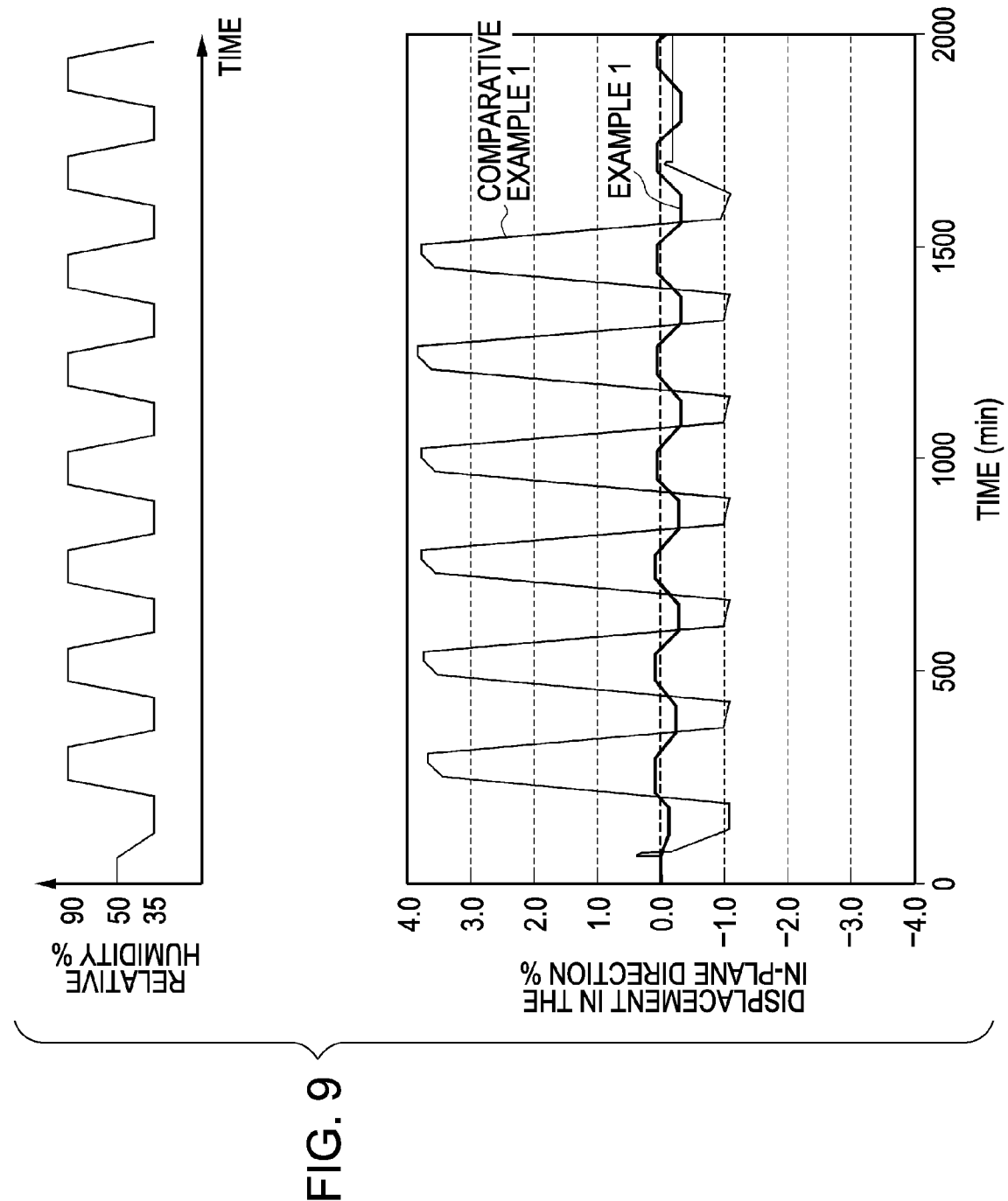
FIG. 9 includes a graph showing a dimensional change in the in-plane direction of Example 1 and Comparative Example 1.
Figure 10:
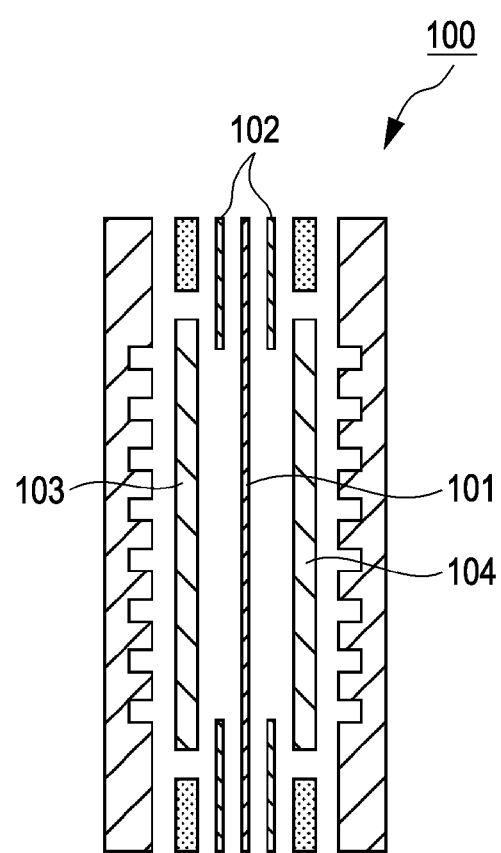
FIG. 10 is a cross-sectional view showing the structure of a membrane-electrode assembly in the related art.

The measurement results of the dimensional changes are shown in FIG. 9. The upper graph of FIG. 9 shows a change in the relative humidity with time. The lower graph of FIG. 9 shows the displacement (%) of the proton-conductive composite membrane of Example 1 and the proton-conductive membrane of Comparative Example 1 in the in-plane direction when the relative humidity was changed with time. Herein, the term "displacement (%) in the in-plane direction" means a dimensional change with time relative to the length of the sample in the initial state. As shown in FIG. 9, the displacement (%) in the in-plane direction of Example 1 was markedly reduced as compared with Comparative Example 1. This result shows that the proton-conductive composite membrane of Example 1 has a small dimensional change in the in-plane direction due to a change in the humidity, and thus that when the proton-conductive composite membrane of Example 1 constitutes a membrane-electrode assembly for a solid polymer electrolyte fuel cell or a solid polymer electrolyte fuel cell, a high mechanical strength and high durability can be achieved regardless of a change in the humidity.

According to an embodiment of the present invention, a proton-conductive composite membrane of a membrane-electrode assembly for a solid polymer electrolyte fuel cell includes a reinforcing sheet having a plurality of through-holes extending in the thickness direction, the through-holes being provided in a portion other than the ends of the reinforcing sheet in the in-plane direction, and an electrolyte membrane provided at least on the surfaces of the portion having the through-holes and on the inner surfaces of the through-holes. With this structure, a dimensional change in the electrolyte membrane caused by expansion and contraction in the in-plane direction due to a change in the humidity can be suppressed by the reinforcing sheet, while maintaining good proton conductivity. That is, according to the embodiment of the present invention, a membrane-electrode assembly for a solid polymer electrolyte fuel cell, the membrane-electrode assembly having good durability and a high mechanical strength regardless of a change in the humidity, can be obtained.

Furthermore, according to an embodiment of the present invention, the membrane-electrode assembly for a solid polymer electrolyte fuel cell is configured so that the ends of the anode electrode layer in the in-plane direction and/or the ends of the cathode electrode layer in the in-plane direction are arranged outside in the in-plane direction with respect to the portion in which the plurality of through-holes are provided. With this structure, since the electrolyte membrane is not provided near the ends of the electrode layers in the in-plane direction, chemical degradation of the electrolyte membrane due to abnormality of the proton concentration, the degradation occurring in the related art near the ends of the electrode layers in the in-plane direction, can be suppressed to obtain good durability.

According to an embodiment of the present invention, in a solid polymer electrolyte fuel cell including the membrane-electrode assembly according to the embodiment of the present invention, the solid polymer electrolyte fuel cell is configured so that at least one of an adhesive layer for bonding constituent members together and a sealing layer that is provided on the constituent members to seal the gas flow paths is arranged only on a portion of the proton-conductive composite membrane, the portion not having the electrolyte membrane thereon. With this structure, a stress generated when a boundary portion between a portion that is in contact with the adhesive layer or the sealing layer and a portion that is not in contact with the adhesive layer or the sealing layer is constrained by a dimensional change in the electrolyte membrane in the in-plane direction due to a change in the humidity can be released by being received at the ends of the reinforcing sheet, the ends not having the electrolyte membrane thereon. Thus, according to the embodiment of the present invention, a solid polymer electrolyte fuel cell having a high mechanical strength and high durability regardless of a change in the humidity can be obtained. Furthermore, it is possible to prevent an acid component contained in the electrolyte membrane from contacting the adhesive layer and the sealing layer. Accordingly, degradation of the adhesive layer and the sealing layer can be prevented, and cross-leakage and gas leakage to the outside can also be suppressed.

The embodiment of the present invention can provide a membrane-electrode assembly for a solid polymer electrolyte fuel cell and a solid polymer electrolyte fuel cell that have sufficient mechanical strength to withstand a dimensional change in an electrolyte membrane due to a change in the humidity and that have good durability.

Obviously, numerous modifications and variations of the present invention are possible in light of the above teachings.

It is therefore to be understood that within the scope of the appended claims, the invention may be practiced otherwise than as specifically described herein.

What is claimed is:

1. A membrane-electrode assembly for a solid polymer electrolyte fuel cell, the membrane-electrode assembly comprising:
   a proton-conductive composite membrane comprising:
      a reinforcing sheet having a plurality of through-holes extending in a thickness direction of the reinforcing sheet, the through-holes being provided in a portion other than an edge of the reinforcing sheet in an in-plane direction, and
      an electrolyte membrane provided on an inner surface of the through-holes and on a surface of the portion of the reinforcing sheet in which the plurality of through-holes are provided;
   an anode electrode layer provided on one surface of the proton-conductive composite membrane;
   a cathode electrode layer provided on another surface of the proton-conductive composite membrane, at least one of an edge of the anode electrode layer and an edge of the cathode electrode layer in the in-plane direction being arranged outside in the in plane direction with respect to the portion in which the plurality of through-holes are provided; and
   a pair of gas diffusion layers provided on the anode electrode layer and the cathode electrode layer, wherein at least one of gas diffusion layers is bonded with an adhesive layer to an edge of the proton-conductive composite membrane in the in-plane direction, wherein the adhesive layer is bonded to the edge of the reinforcing sheet.

2. A solid polymer electrolyte fuel cell comprising:
   the membrane-electrode assembly according to claim 1;
   a pair of separators that are stacked on both surfaces of the membrane-electrode assembly to form gas flow paths; and
   at least one of an adhesive layer and a sealing layer, the adhesive layer being for bonding constituent members together, the sealing layer being provided on the constituent members to seal the gas flow paths, at least one of the adhesive layer and the sealing layer being arranged on a portion of the proton-conductive composite membrane where the electrolyte membrane is not provided.

3. The membrane-electrode assembly according to claim 1, wherein the adhesive layer is bonded to the edge of the proton-conductive composite membrane only on a portion where the electrolyte membrane is not provided.

4. The membrane-electrode assembly according to claim 1, wherein the adhesive layer is bonded to the reinforcing sheet only on a portion where the electrolyte membrane is not provided.

5. The membrane-electrode assembly according to claim 4, wherein the adhesive layer does not contact the electrolyte membrane.

6. The membrane-electrode assembly according to claim 1, wherein the adhesive layer is directly bonded to the reinforcing sheet and the at least one of the gas diffusion layers.

\* \* \* \* \*